US012621671B2

(12) United States Patent　　　　　(10) Patent No.: US 12,621,671 B2
Somashekar et al.　　　　　　　　　　(45) Date of Patent: May 5, 2026

(54) DYNAMIC UTILIZATION-BASED NETWORK SLICE ALLOCATION MANAGEMENT FOR USER EQUIPMENT APPLICATIONS

(71) Applicant: T-MOBILE INNOVATIONS LLC, Overland Park, KS (US)

(72) Inventors: Sharath Somashekar, Overland Park, KS (US); Diego Estrella Chavez, McLean, VA (US); Akriti Kumar, Brambleton, VA (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 315 days.

(21) Appl. No.: 18/422,458

(22) Filed: Jan. 25, 2024

(65) Prior Publication Data

US 2025/0247710 A1　　Jul. 31, 2025

(51) Int. Cl.
*H04W 16/10*　　　(2009.01)
*H04L 43/0882*　　(2022.01)
*H04W 24/02*　　　(2009.01)

(52) U.S. Cl.
CPC ......... *H04W 16/10* (2013.01); *H04L 43/0882* (2013.01); *H04W 24/02* (2013.01)

(58) Field of Classification Search
CPC .... H04W 16/10; H04W 24/02; H04L 43/0882
USPC ......................................... 370/329
See application file for complete search history.

(56) References Cited

U.S. PATENT DOCUMENTS 11,432,159 B2　 8/2022　Buyukdura
2018/0359337 A1 * 12/2018　Kodaypak ........... H04L 12/1886
2020/0389828 A1 * 12/2020　Venkataraman ...........................
　　　　　　　　　　　　　　　　　　　　　　H04W 36/00698
2023/0111373 A1　 4/2023　Chandran
2023/0224787 A1　 7/2023　Vrzic
(Continued)

OTHER PUBLICATIONS

International Search Report and Written Opinion in PCT/US2025/012710 dated Mar. 31, 2025, 8 pages.
(Continued)

*Primary Examiner* — Hermon Asres
(74) *Attorney, Agent, or Firm* — Shook, Hardy & Bacon L.L.P.

(57)　　　　ABSTRACT

Systems and methods for dynamic utilization-based network slice allocation management for user equipment applications are provided. In some embodiments, a slice estimation engine may be implemented to evaluate the network traffic and other application activity data associated with an application running on the UE to determine an operating mode of the application. The slice estimation engine may trigger the UE to request an adjustment to its network slice allocation configurations based on the evaluation. To determine whether or not an application should be reconfigured for a new network slice, the slice estimation engine may evaluate processes that are running on the UE. The slice estimation engine may comprise one or more slice assessment algorithms that determine which slice from a set of available network slices would optimally serve the application based on the network traffic characteristics associated with the application's current mode of operation.

18 Claims, 7 Drawing Sheets

(56) References Cited

U.S. PATENT DOCUMENTS

2023/0283529 A1 * 9/2023 Zhang ................... H04W 28/24
370/235

OTHER PUBLICATIONS

Abbas, K., et al., "Network Slice Lifecycle Management for 5G Mobile Networks: An Intent-Based Networking Approach", IEEE Access, vol. 9, Jun. 8, 2021, pp. 80128-80146.
Ericsson, "Ericsson enables multiple tailored slices for smartphones with Dynamic Network Slice Selection launch", Dynamic Network Slice Selection, Jan. 27, 2022. pp. 1-6.
Ericsson, "FarEasTone and Ericsson mark a breakthrough in 5G network slicing", Nov. 1, 2021. pp. 1-5.
Nhu, C., et al., "Dynamic Network Slice Scaling Assisted by Attention-Based Prediction in 5G Core Network", Research Article, vol. 10, Jul. 18, 2022. pp. 72955-72972.

* cited by examiner

110

136

400

EVALUATING ONE OR MORE CHARACTERISTICS OF APPLICATION ACTIVITY
DATA ASSOCIATED WITH AT LEAST ONE APPLICATION EXECUTED ON A USER
EQUIPMENT (UE)
B410

ASSOCIATING THE INDICATION OF THE OPERATING MODE TO A NETWORK
SLICE ALLOCATION CONFIGURATION
B412

TRIGGERING THE UE TO SEND A NETWORK SLICE ALLOCATION REQUEST TO
THE OPERATOR CORE NETWORK TO ALLOCATE A NETWORK SLICE TO THE UE
BASED AT LEAST ON THE NETWORK SLICE ALLOCATION CONFIGURATION
B414

MEMORY

512

PROCESSOR(S)

514

PRESENTATION
COMPONENT(S)

516

RADIO(S)

524

I/O PORT(S)

518

I/O COMPONENTS

520

POWER SUPPLY

522

510

600

DYNAMIC UTILIZATION-BASED NETWORK SLICE ALLOCATION MANAGEMENT FOR USER EQUIPMENT APPLICATIONS

BACKGROUND

A 5G network slice is a telecommunications network configuration that establishes multiple independent virtualized networks on the common physical infrastructure of a 5G network operator core. For each network slice instance, associated network functions can be orchestrated as needed to support the specific needs and/or use case of the customer using the network slice. Network resources allocated to a network slice may be tailored to customize parameters such as bandwidth, speed, and latency. A network slice may be established for a customer by the 5G network operator as a service that essentially provides the customer with a private end-to-end networking solution that includes complete logical isolation from other slices operating on the same physical infrastructure elements of the 5G network operator core and through common access networks (e.g., radio access networks).

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments presented in the disclosure provide for, among other things, systems and methods for dynamically switching the network slice allocations provided by a telecommunications network to a user equipment (UE) for an application. One or more of the embodiments disclosed herein introduce a technology through which the UE and/or the telecommunications network can identify and communicate in real-time an application's type of usage of network resources and trigger the network to dynamically switch network slices allocated to the application. For example, in some embodiments, a slice estimation engine may be implemented to evaluate the network traffic and other application activity data associated with an application running on the UE to determine an operating mode of the application, and trigger the UE to request an adjustment to its network slice allocation configurations based on the evaluation. The slice estimation engine may have access to monitor resource allocation and utilization processes within the UE to evaluate the type of network traffic associated with one or more of the applications being executed by the UE. The slice estimation engine may determine when an application should use a network slice with a higher or lower level of Quality of Service (QOS) based on an evaluation of application activity data for that application. In some embodiments, to determine whether or not an application should be reconfigured for a new network slice, the slice estimation engine evaluates in real-time processes that are running on the UE and looks at characteristics of network traffic associated with the processes, such as the amount of bandwidth that is being used, for example. The slice estimation engine may comprise one or more slice assessment algorithms that determine which slice from a set of available network slices would optimally serve the application based on the network traffic characteristics associated with the application's current mode of operation. The slice assessment algorithms may then select a network slice allocation that correlates with the evaluation and triggers the UE to send a network slice allocation request to the operator core network to allocate a corresponding network slice configuration to the UE for use by the application.

BRIEF DESCRIPTION OF THE DRAWINGS

Aspects of the present disclosure are described in detail herein with reference to the attached Figures, which are intended to be exemplary and non-limiting, wherein:

FIG. 4 is a flow chart illustrating an example method for dynamic network slice allocation in accordance with some embodiments described herein;

DETAILED DESCRIPTION

Figure 1:
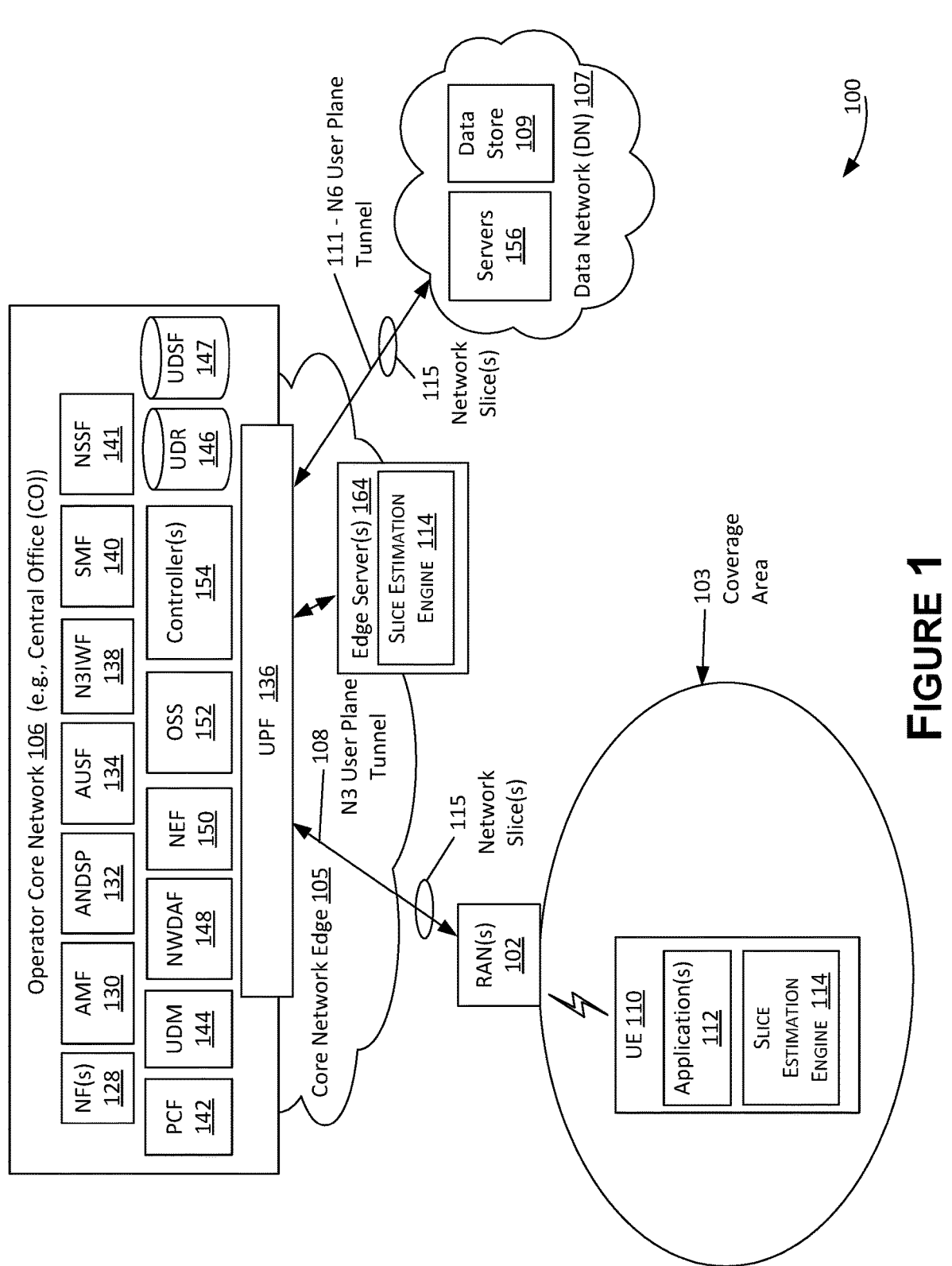
FIG. 1 is a diagram illustrating an example network environment for a telecommunications network, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more of the embodiments presented in the disclosure provide for, among other things, systems and methods for dynamically adjusting the network slice configuration used by user equipment (UE) executed applications. Currently a UE operating on a cellular network, such as a 5G stand-alone (SA) network, may be configured to operate on one or more network slices based on Quality-of-Service (QOS) specifications for an application or the type of network traffic associated with the application, such as with respect to network latency, bandwidth, data rates, and/or reliability, for example. When an application is executed, a slice for the application may be selected based on a policy associated with the application. If the UE already has an established slice appropriate for the application per the policy, the application may establish connectivity via the telecommunications network over that slice. If the UE does not have an established slice appropriate for the application per the policy, the UE may trigger instantiation of a new network slice connection appropriate for the application per the policy.

Currently, once a network slice is allocated to an application, the application remains on that network slice until execution of the application is terminated. However, the characteristics of network traffic used by an application may vary over time and/or be based on how the application is being used. If a network slice is allocated to an application based on its highest QoS level, such as a peak bandwidth and/or low-latency criteria, then that network slice may represent an over-allocation of network resources to the application at times where the application is operating in a mode that is not utilizing high-bandwidth and/or low-latency traffic. For example, the UE may be executing an application that receives network traffic from the telecommunications network that includes low-bandwidth textual and/or still frame image content during some periods, and high-bandwidth video streaming at other periods. An example of such an application may be an application for a video streaming service. When the application is presenting a high-definition video stream on the UE (e.g., a 4K video stream), then a network slice supporting a high level of data packet throughput may be allocated to support the high-definition video streaming traffic. However, when a user is instead just using the application for low-bandwidth tasks, such as to browse a catalog of available streaming content, or has the application otherwise idle (e.g., running in the background), then that initial network slice capable of supporting high-definition video stream is unnecessarily reserving and/or allocating finite network resources that are inefficiently in excess of what is adequate to support the application at that time.

As discussed in greater detail herein, some embodiments of this disclosure, among other things, better optimize the use of network resource—while maintaining a quality user experience—by dynamically switching the network slice allocations to a UE application based at least on the network QoS level to support the current mode of operation of that UE application. That is, one or more of these embodiments introduce a technology through which the UE and/or the telecommunications network can identify and communicate in real-time an application's type of usage of network resources and trigger the network to dynamically switch network slices allocated to the application.

In some embodiments, during an initial UE network registration process, the core network identifies the network slices that the UE is subscribed to, which represents the set of available network slices that may potentially be allocated to the UE. When an application is executed on the UE, the UE (and that application) may be allocated one or more network slices from that set of network slices based on a network policy. The application may communicate to the operator core network an application ID that includes a slice identifier that may be correlated with the set of available network slices to allocate a network slice to the application. For example, the slice identifier may be based on a preselected 3GPP Slice identifier-such as a Slice/Service Type (SST) and/or service differentiator (SD) of a Single-Network Slice Selection Assistance Information (S-NSSAI) that is predefined for certain types of traffic, for example. For example, an SST field may be 8 bits in length, providing a capacity to identify up to 255 different network slice types. In some embodiments, the slice identifier may further include an indication representing a duration for which the network slice allocation is to be triggered, such as a duration of time during which one or more sub-functions within the application are triggered. Once the duration has expired, the network slice associated with that slice identifier may be deallocated and the network slice configuration for the UE restored to a default configuration. Such deallocation may be triggered, for example, by the UE by transmitting a subsequent slice identifier to the core network. As such, the activation of one or more functions within the application may trigger the request for an allocation of a predetermined network slice to support those functions, with the allocation configuration withdrawn (and a default configuration restored) once those functions complete their respective tasks. In some embodiments, requests from the UE to the operator core network to allocate and/or deallocate a network slice configuration may be communicated via a protocol data unit (PDU) session modification request initiated by the UE. The PDU session modification request may include a slice identifier with an indication of the network slice configuration being requested by the UE.

In some embodiments, a slice estimation engine may be implemented on the UE to evaluate the network traffic associated with one or more applications running on the UE, and trigger adjustments to network slice configurations based on the evaluation. In some embodiments, the slice estimation engine may be installed on the UE by the network operator during a network service initialization. The slice estimation engine may have access to monitor resource allocation and utilization processes within the UE to evaluate the type of network traffic associated with one or more of the applications being executed by the UE. The slice estimation engine may determine when an application should use a network slice with a higher or lower level of QoS based on an evaluation of network traffic for that application. The slice estimation engine may be installed as a process that automatically runs as a background process.

In some embodiments, to determine whether or not an application should be allocated a particular network slice, the slice estimation engine evaluates in real-time processes that are running on the UE and looks at characteristics of network traffic associated with the processes, such as the amount of bandwidth that is being used, for example. In some embodiments, the slice estimation engine may include a database (or other definition map or table) that correlates network traffic characteristics with the set of available network slices that may be allocated to the UE (e.g., as established based on subscription information at the initial UE network registration process). The slice estimation engine may comprise one or more slice assessment algorithms that determine which slice from the set of available network slices would optimally serve the application based on the network traffic characteristics associated with the application's current mode of operation. To select an optimal network slice, the slice assessment algorithms may evaluate network traffic characteristics such as bandwidth, latency, throughput, and/or other key performance indicators (KPIs) such as the amount of UE processing power associated with implementing relatively higher performance slice configurations. The slice assessment algorithms may then select (e.g., from the database or map) a slice allocation that correlates with the evaluation and may trigger the UE to send a request including a slice identifier to the operator core network (e.g., a PDU session modification request) to allocate a corresponding network slice configuration to the UE for use by the application.

In some embodiments, an application may be allocated an initial network slice allocation configuration (e.g., a default network slice) based on an application identifier for the application. In some embodiments, the slice estimation engine may trigger a request for a network slice allocation configuration based on evaluating a routing selection policy associated with the application. For example, an application associated with a routing selection policy that routes traffic to a known video streaming service may be allocated an initial network slice allocation configuration that supports high-bandwidth network traffic, and subsequently switch to a lower bandwidth slice allocation configuration in response to the slice estimation engine detecting that the application is operating in a mode that does not communicate high-bandwidth network traffic. As such, in some embodiments, the slice estimation engine may trigger requests for network slice allocations based on a monitoring and/or evaluation of network traffic (e.g., network traffic characteristics) being used by an application rather than, or in addition to, an application identifier (ID) or other information provided by the application itself.

As mentioned herein, in some embodiments, the slice estimation engine may trigger the UE to transmit a slice identifier to the operator core network (e.g., a PDU session modification request) to request allocation of a specific network slice configuration to the UE for use by the application. In some embodiments, a network slice selection function (NSSF) of the operator core may function as a slice coordination network function to control the operator core network to orchestrate individual dedicated instances of one or more of the network functions described herein to establish and support operation of network slices allocated to the UE based on the requests from the UE triggered by the slice estimation engine. As explained in greater detail below, using network slicing, the user plane function (UPF) for the network may establish a dedicated slice network function for one or more data channels between various network functions and other entities that act as, in essence, a distinct network for carrying traffic within the same physical network architecture of the telecommunications network. The NSSF may therefore establish and/or break down network slices, and/or allocate and/or deallocate access to network slices dynamically in response to requests triggered by the slice estimation engine in order to optimally facilitate the network usage of the UE application-providing high-level network slices for a duration of time, and dropping back to switch to lower-level network slices to more efficiently allocate network resources when high-level network slices are not warranted.

In some embodiments, a slice estimation engine may be executed (at least in part) as a network function, such as a network function of the UPF. Such a UPF hosted slice estimation engine may trigger a UE to request updates to the network slice configuration profile used by a UE application in the same manner as discussed above for a UE executed slice estimation engine. Having the slice estimation engine running on the UPF has the advantage of avoiding, or at least limiting, the installation of the slice estimation engine on the UE and/or the related consumption of UE processing resources by running the slice estimation engine in the background. As a trusted core network implemented function, the slice estimation engine running as a function of the UPF may have the capacity to query the UE regarding the use of UE resources. Based on this information, a UPF hosted slice estimation engine may evaluate resource allocations, buffer loadings, and/or other operating data within the UE to characterize the type of network traffic associated with one or more of the applications being executed by the UE. Like the UE hosted slice estimation engine, the UPF hosted slice estimation engine may determine when an application should potentially be using a network slice with a higher or lower level of QoS based on the characteristics of network traffic for that application. However, in some embodiments, the UPF hosted slice estimation engine may not have the capacity to query the UE regarding the use of UE resources. In such instances, the UPF hosted slice estimation engine may nonetheless directly evaluate characteristics of network traffic, such as data rates, the magnitude of traffic flow, and routing selection policy, based on traffic flow through the UPF associated with that UE. Based on the characteristics of network traffic, the slice estimator function may determine what type of traffic is being used (video versus voice, augmented reality (AR), Haptic, etc.) and associate that with an application running on the UE. This information be used to trigger the UE to transmit a slice identifier to the core network (e.g., a PDU session modification request), thereby dynamically modifying the network slice used by an application for that period of time while using that type of traffic having those characteristics.

In some embodiments, a slice estimation engine may sample resource utilization data from the UE and/or assess one or more characteristics of network traffic associated with the UE, and apply that data to a machine learning model trained to predict a classification of network traffic (e.g., an artificial intelligence inference engine) that may be correlated against the UE's set of available network slices to select an available network slice matching the predicted classification. The slice estimation engine may then trigger the UE to transmit a request to the core network with a slice identifier to request that network slice for use with the application.

In some embodiments, one or more functions of the slice estimation engine may be executed as an element of the user plane function (UPF) of the operator core network and/or a node of the core network edge. That is, the slice estimation engine may be executed as a process on a UE, as a process executed by a node of the UPF, and/or implemented via functions distributed amongst the UE and the UPF.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein, and nor should the network environment be interpreted as having any dependency or requirement relating to any one or combination of components illustrated.

As shown in FIG. 1, network environment 100 comprises an operator core network 106 (also referred to as a "core network") that provides one or more network services to one or more UEs 110 (e.g., 3GPP UE) via at least one access network, such as radio access network (RAN) 102. In some embodiments, network environment 100 comprises, at least in part, a wireless communications network, such as, but not limited to, a 5G wireless communications network.

In some embodiments, the network environment 100 comprises one or more radio access networks (RANs) 102, which may be referred to in the context of a wireless telecommunications network as a wireless base station, cell site, or cellular base station. A RAN 102 may represent at least one wireless base station coupled to an operator core network to establish one or more communication links between the operator core network 106 and a user equipment (UE) 110. Each RAN may provide wireless connectivity access to one or more UEs operating within a coverage area 103 associated with that RAN 102. The RAN 102 may implement wireless connectivity using, for example, 3GPP technologies. The RAN 102 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 102 may comprise, at least in part, components of a customer premises network, such as a distributed antenna system (DAS), for example.

Radio access network(s) 102 may comprise a multimodal network (for example, comprising one or more multimodal access devices) where multiple radios supporting different systems are integrated into the radio access network(s) 102. Such a multimodal access network may support a combination of 3GPP radio technologies (e.g., 4G, 5G, and/or 6G) and/or non-3GPP radio technologies (e.g., IEEE 802.11 (WiFi) and/or IEEE 802.15 (Bluetooth) access points). In some embodiments, the radio access network(s) 102 may comprise a terrestrial wireless communications base station and/or may be at least in part implemented as a space-based access network, such as a base station implemented by an Earth-orbiting satellite. Individual UE 110 may communicate with the operator core network 106 via the RAN 102 over one or both of uplink (UL) radio frequency (RF) signals and downlink (DL) radio frequency (RF) signals.

The radio access network(s) 102 may be coupled to the operator core network 106 via a core network edge 105 that comprises edge server nodes and wired and/or wireless network connections that may further include wireless relays and/or repeaters. In some embodiments, the RAN 102 may be coupled to the operator core network 106 at least in part by a backhaul network such as the Internet or other public or private network infrastructure. Core network edge 105 may comprise one or more network nodes (e.g., servers) or other elements of the operator core network 106 that may define the boundary of the operator core network 106 and may serve as the architectural demarcation point where the operator core network 106 connects to other networks such as, but not limited to, RAN 102, the Internet, Data Network (DN) 107, and/or other third-party networks. In some embodiments, the network edge 105 may comprise one or more network nodes that include edge server(s) 164. Edge server(s) 164 may provide, for example, edge-based services to UE 110 that may be accessed separately from services provided by network functions of the operator core network 106. For example, edge server(s) 164 may host databases, caches, microservices, ledgers, decentralized applications (e.g., DApps), and/or may perform data traffic monitoring, inspections, and/or aggregation for other network functions of the network environment 100.

It should be understood that in some aspects, the network environment 100 may not comprise a distinct operator core network 106, but rather may implement one or more features of the operator core network 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include one or more data stores 109 and/or one or more content-services servers 156. In some embodiments, UE 110 may access services and/or content provided by the data store(s) 109 and/or server(s) 156 of DN 107.

Generally, an individual UE 110 may comprise a device capable of unidirectional or bidirectional communication with the operator core network 106 via wireless and/or wired communication links. The network environment 100 may be configured for wirelessly connecting UEs 110 to other UEs 110 via the same access networks (e.g., RANs 102), via other access networks, via other telecommunications networks, and/or to connect UEs 110 to a public switched telecommunications network (PSTN). The network environment 100 may be generally configured, in some embodiments, for connecting UE 110 to data, content, and/or services that may be accessible from one or more application servers or other functions, nodes, or servers. In allocating network resources and access to these data or services, the operator core network 106 may instantiate one or more network slices 115 and allocate one or more of those slice(s) 115 to carry network traffic for one or more applications 112 executed by processors of the UE 110. Within the context of the network slice(s) 115 as described herein, an individual UE 110 may function in the capacity of a subject entity that requests data and/or services from other networked elements (e.g., network functions and/or elements of DN 107) via network slice(s) 115 and/or a resource entity that provides data and/or services to other networked elements (e.g., network functions and/or elements of DN 107) via network slice(s) 115.

UEs 110 are in general forms of equipment and machines such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the UE 110 may include both mobile UE and stationary UE. A UE 110 can include one or more processors and one or more non-transient computer-readable media for executing code to carry out the functions of the UE 110 described herein, including one or more aspects of a slice estimation engine 114 discussed herein. The computer-readable media may include computer-readable instructions executable by the one or more processors. In some embodiments, the UE 110 may be implemented using a computing device 500, as discussed below with respect to FIG. 5.

In some implementations, the operator core network 106 may comprise modules, also referred to as network functions (NFs), implemented by one or more processors and generally represented in FIG. 1 as NF(s) 128. Individual network functions that are distinctly illustrated in FIG. 1 may include, but are not limited to, one or more of a core access and mobility management function (AMF) 130, an access network discovery and selection policy (ANDSP) 132, an authentication server function (AUSF) 134, a user plane function (UPF) 136, non-3GPP interworking function (N3IWF) 138, a session management function (SMF) 140, a network slice selection function (NSSF) 141, a policy control function (PCF) 142, unified data management (UDM) 144, a unified data repository (UDR) 146, an unstructured data storage function (UDSF) 147, a network data analytics function (NWDAF) 148, a network exposure function (NEF) 150, and an operations support system (OSS) 152. Implementation of these NFs of the operator core network 106 may be executed by one or more controllers 154 on which these network functions are orchestrated or otherwise configured to execute utilizing processors and memory of the one or more controllers 154. The NFs may be implemented as physical and/or virtual network functions, container network functions, and/or cloud-native network functions, such as is described with respect to FIG. 6. Within the context of network slice(s) 115 created by the operator core network 106, the operator core network 106 may orchestrate individual dedicated instances of one or more of the network functions described herein to establish and support operation of a network slice 115.

Notably, the nomenclature used herein is used primarily with respect to the 3GPP 5G architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management. In other forms, such as a 4G architecture, the AMF 130 of FIG. 1 may take the form of a mobility management entity (MME). The operator core network 106 may be generally said to authorize rights to and facilitate access to an application server/service, such as provided by application function(s) requested by one or more UEs, such as UE 110. In some embodiments, the NSSF 141 works in conjunction with the AMF 130 to establish network slice instances of network slice(s) 115, such as is described herein.

As shown in FIG. 1, UPF 136 represents at least one function of the operator core network 106 that may extend into the core network edge 105. In some embodiments, the RAN 102 is coupled to the UPF 136 within the core network edge 105 by a communication link that includes an N3 user plane tunnel 108. For example, the N3 user plane tunnel 108 may connect a cell site router of the RAN 102 to an N3 interface of the UPF 136. The data store(s) 109, server(s) 156, and/or other elements of DN 107 may be coupled to the UPF 136 in the core network edge 105 by an N6 user plane tunnel 111. For example, the N6 user plane tunnel 111 may connect a network interface (e.g., a switch, router, and/or gateway) of the DN 107 to an N6 interface of the UPF 136. In some embodiments, the operator core network 106 may comprise a plurality of UPFs 136, such as a UPF at the operator core network 106 and a UPF at the core network edge 105. For example, a UPF at the core network edge 105 may be used for local breakout and/or low-latency types of application via an N9 interface between the distinct UPFs.

The AMF 130 facilitates mobility management, registration management, and connection management for 3GPP devices, such as a UE 110. ANDSP 132 facilitates mobility management, registration management, and connection management for non-3GPP devices (e.g., devices that connect via the N3IWF 138). AUSF 134 may receive authentication requests from the AMF 130 and interacts with UDM 144, for example, for subscriber identification module (SIM) authentication and/or to authenticate a UE 110 based on a device identification (ID). N3IWF 138 provides a secure gateway for non-3GPP network access, which may be used for providing connections for UE 110 access to the operator core network 106 over a non-3GPP access network (e.g., via a data link established between a customer premise gateway 161 and the N3IWF 138).

SMF module 140 facilitates initial creation of protocol data unit (PDU) sessions with UE 110 using session establishment procedures. The PCF 142 maintains and applies policy control decisions and subscription information. Additionally, in some aspects, the PCF 142 maintains quality-of-service (QOS) policy rules. For example, the QoS rules stored in a unified data repository (UDR) 146 can identify a set of access permissions, resource allocations, or any other QoS policy established by an operator. The Unstructured Data Storage Function (UDSF) 147 may store dynamic state data, which is structured and unstructured data related to network function of the operator core network 106. That is, the UDSF 147 may support storage and retrieval of structured and/or unstructured data by other network functions 128 of the operator core network 106, including information relating to access control and service and/or microservice subscriptions.

In some embodiments, the PCF 142 maintains subscription information indicating one or more services and/or microservices subscribed to by each UE 110. In some embodiments, a PCF 142 instance may maintain subscription information pertaining to UE 110 authorized to access services from within a network slice 115. The UDM 144 manages network user data including, but not limited to, data storage management, subscription management, policy control, and core network 106 exposure. NWDAF 148 collects data (for example, from UE; other network functions; application functions; and operations, administration, and maintenance (OAM) systems) that can be used for network data analytics. The OSS 152 is responsible for the management and orchestration of one or more elements of the operator core network 106 and the various physical, virtual network functions, container network functions, controllers, computer nodes, and other elements that implement the operator core network 106.

Some aspects of network environment 100 include the UDR 146 storing information relating to access control and service and/or microservice subscriptions. The UDR 146 may be configured to store information relating to such subscriber information and may be accessible by multiple different network functions (NFs) 128 in order to perform desirable functions. For example, the UDR 146 may be accessed by the AMF 130 in order to determine subscriber information pertaining to the UE 110 (e.g., which network slices the UE 110 is subscribed to use), accessed by a PCF 142 to obtain policy-related data, and/or accessed by NEF 150 to obtain data that is permitted for exposure to third-party applications (such as applications 112 executed by UE 110, for example). Other functions of the NEF 150 include monitoring of UE-related events and posting information about those events for use by external entities, and providing an interface for provisioning UEs 110 (e.g., via PCF 142) and reporting provisioning events to the UDR 146. Although depicted as a unified data management module, UDR 146 can be implemented as a plurality of network function specific data management modules. As mentioned above, in the context of a network slice 115, the operator core network 106 may orchestrate individual instances of each of these network functions and other such network functions described herein that are dedicated to the network slice 115.

The UPF 136 is generally configured to facilitate user plane operation relating to packet routing and forwarding, interconnection to a data network (e.g., DN 107), policy enforcement, and data buffering, among other operations. Using network slicing (e.g., based on 5G software-defined networking managed by the 5G network slice selection function (NSSF) 141), the UPF 136 may establish a dedicated slice network function for one or more data channels between various network functions and other entities that act as, in essence, a distinct network (for example, establishing its own QoS, provisioning, and/or security) within the same physical network architecture of network environment 100. As explained herein, the NSSF 141, either alone or in conjunction with other network functions of the operator core network 106, may function as a slice coordination network function to control the operator core network 106 to orchestrate individual dedicated instances of one or more of the network functions described herein to establish and support operation of network slices allocated to the UE 110 based on network slice allocation requests from the UE 110 triggered by the slice estimation engine 114. A network slice type may be used to identify service characteristics of a network slice 115, and at least in part may define the configuration of the slice network functions that make up that network slice. For example, in different implementations, a UE 110 may be assigned a network slice 115 (e.g., for use by application(s) 112), such as an Enhanced Mobile Broadband (eMBB) network slice, a Massive Machine Type Communications (MMTC) network slice, an Ultra-Reliable Low-Latency Communication (URLLC) network slice, or a Public Safety (PS) network slice. A network slice instance, therefore, may comprise an instantiation of a specific network slice type. Moreover, as discussed herein, one or more aspects of a slice estimation engine 114 may be implemented at least in part by network nodes of the UPF 136.

Figure 2:
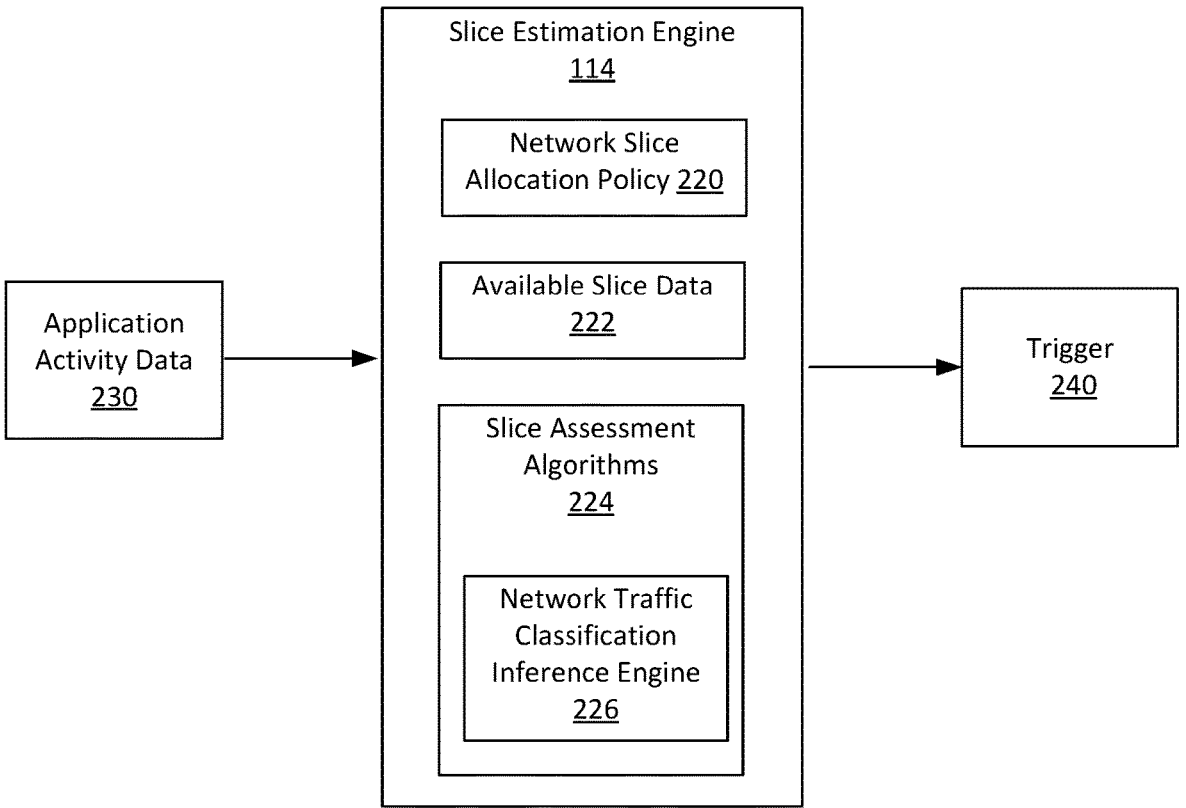
FIG. 2 is a diagram illustrating an example slice estimation engine for dynamic network slice allocation, in accordance with some embodiments described herein.

As shown in FIG. 2, in some embodiments, a slice estimation engine 114 (whether implemented in UE 110 and/or as a network function of UPF 136) may include a network slice allocation policy 220, a set of available slice data 222 (e.g., an available slice database), and/or one or more slice assessment algorithms 224. In some embodiments, the one or more slice assessment algorithms 224 may include a machine learning model implementing a network traffic classification inference engine 226. Although illustrated as distinct elements of the slice estimation engine 114, one or more of the network slice allocation policies 220, available slice data 222, and/or one or more slice assessment algorithms 224 may be integrated together and/or their functions implemented at least in part by other elements of the UE 110.

In some embodiments, when UE 110 network connectivity is initialized with the operator core network 106, the NSSF 141 (e.g., based on subscription information from the PCF 142) may identify a set of available network slices that may potentially be allocated to the UE 110. An indication of this set of available network slices for a UE 110 may be provided to the slice estimation engine 114 and stored as available slice data 222. The available slice data 222 may thus represent the set of available network slices that the operator core network 106 has determined that the UE 110 is able to use and authorized as available for potential allocation to the UE 110 (e.g., based on that UE 110's applicable capabilities and subscription(s)).

In some embodiments, the slice estimation engine 114 may apply the one or more slice assessment algorithms 224 to evaluate in real-time the application(s) 112 that are running on the UE 110 and assess (e.g., evaluate) characteristics of application activity data 230 associated with the application(s) 112. Application activity data 230 may include any form of data that characterizes an aspect of an application's network usage (e.g., characteristics of network traffic and/or usage of UE 110 processing resources) that may reveal an operating mode of the application 112. The way in which an application 112 utilizes its network connection may vary over time depending on the application 112's operating mode, with some operating modes causing the application 112 to place greater demands on network resources than other operating modes. Based on predicting an operating mode of the application 112, the slice estimation engine 114 may determine which of the network slices indicated as available by the available slice data 222 is most optimally suited for the current operating mode of the application 112—and trigger the UE 110 to request an allocation of that network slice to UE 110 for use by the application 112. That is, once an operating mode for an application 112 is determined, the slice estimation engine 114 may reference the network slice allocation policy 220 and the available slice data 222 to determine which network slice the UE 110 should request for the application 112.

In some embodiments, the slice assessment algorithm(s) 224 may execute a multi-classification analysis using the application activity data 230 to assess what characteristics of network traffic correlate with an application's current operating mode, such as, but not limited to, network traffic data rates, data latency, or patterns such as whether the network traffic is in the form of occasional traffic bursts as opposed to streaming, whether the traffic is primarily uplink versus downlink, or balanced in nature, and/or other characteristics. The network slice allocation policy 220 may include, for example, a definition map or table that correlates such network traffic characteristics detected by the slice assessment algorithm(s) 224 with different candidate network slices. The slice estimation engine 114 uses the network slice allocation policy 220 to identify network slices that match the characteristics of network traffic for the application's current operating mode, and then selects a network slice from the available slice data 222. The output from the slice estimation engine 114 is a trigger message 240 that may be sent, for example, to a network management function of the operating system of the UE 110 to cause the UE 110 to request an allocation of a network slice from the operator core network 106. In some embodiments, the slice assessment algorithm(s) 224 may sample the application activity data 230 and/or assess one or more characteristics of network traffic associated with an application 112, and apply that data to a network traffic classification inference engine 226. The network traffic classification inference engine 226 may comprise a machine learning model trained to predict one or more classification(s) related to the characteristics of network traffic associated with the application's current operating mode. That is, in some embodiments, the network traffic classification inference engine 226 may by trained as a machine learning model to infer an operating mode of an application 112 based at least on an input of the application activity data 230. The slice estimation engine 114 uses the inferred operating mode predicted by the network traffic classification inference engine 226 to identify candidate network slices based on network slice allocation policy 220 and select a network slice from the available slice data 222 to request for allocation to the application 112.

In response to the trigger message 240, the UE 110 may transmit to the operator core network 106 (e.g., the NSSF 141) a slice allocation request comprising a slice identifier (e.g., a PDU session modification request) that includes an indication of a network slice selected by the slice estimation engine 114 (e.g., a slice identifier associated with the selected network slice). In some embodiments, the slice allocation request may further include an application ID for the application 112 associated with the selected network slice. The operator core network 106 may then respond to the slice allocation request by allocating the requested network slice to the UE 110 for use by the application 112 and/or otherwise instantiating an instance of the requested network slice. In some embodiments, instantiating the requested network slice may further include the operator core network 106 (e.g., the NSSF 141) deallocating and/or dismantling the instance of the initial network slice that is being replaced by the requested network slice. The operator core network 106 may first instantiate the requested network slice and transfer the application 112 over to the new network slice instance before deallocating the initial network slice so that the application 112 does not experience a substantive interruption of network connectivity and/or network traffic. That is, the application 112 may remain running on the UE 110 with an active PDU session (e.g., with data store(s) 109 and/or content server(s) 156) during the network slice transfer from the first (e.g., initial) network slice to the second (e.g., requested) network slice. Increased network efficiency is realized by optimally matching an application 112 operating mode to a network slice, while avoiding restarting and/or initializing the application 112 with the operator core network 106.

In some embodiments, the slice assessment algorithms 224 may be programmed to access operating system processes of the UE 110 to obtain the application activity data 230. For example, one or more functions of the UE 110 operating system may monitor and/or control processing resource consumption and/or network traffic associated with each of the applications 112 running on the UE 110. For example, the slice assessment algorithms 224 may determine from the application activity data 230 operating mode information, such as whether an application 112 is an active application executing in the foreground (which may in part indicate a relatively higher level of active use of a network connection) as opposed to an application that is running as a background process and/or is otherwise idle (which may in part indicate a relatively lower level of active use of a network connection).

In some embodiments, the slice assessment algorithm(s) 224 may assess from the application activity data 230 whether application 112 is in an operating mode that is associated with one or more specific characteristics of network traffic. The slice assessment algorithms 224 may determine network traffic characteristics associated with the current operating mode of an application 112, such as bandwidth, data rates, latency, reliability, and/or other QoS or KPI considerations, and classify the current operating mode of the application 112 based on the characteristics. In some embodiments, the slice assessment algorithm(s) 224 may infer one or more characteristics of network traffic from application activity data 230 based on evaluating a routing selection policy associated with an application 112.

For example, an application 112 that has a routing selection policy that routes traffic to a server 156 for a known video streaming service may be allocated an initial network slice allocation configuration that supports high-bandwidth network traffic. The slice assessment algorithm(s) 224 may subsequently detect from application activity data 230 when the application 112 has shifted to an operation mode that does not involve communicating high-bandwidth network traffic (e.g., catalog browsing) and, referencing the network slice allocation policy 220 and available slice data 222, and select a lower bandwidth slice allocation configuration for the UE 110 to request as described herein. When the application 112 shifts back to the high-bandwidth network traffic operating mode, then the slice assessment algorithms 224 may again detect that change from application activity data 230 and reselect the higher bandwidth slice allocation configuration for the UE 110 to request. The NSSF 141 may respond to such network slice allocation requests from the UE 110 to allocate and/or deallocate access to network slices 115 dynamically in response to requests triggered by the slice estimation engine 114.

The slice estimation engine 114 thus benefits both the operation of the UE 110 and/or the operator core network 106 by optimally facilitating the network slice allocations for the UE application 112—providing high-level network slice(s) 115 for some operating modes, and lower level network slice(s) 115 for other operating modes, to more efficiently allocate network resources while continuing to run the application 112 on the UE 110 without interruption. In some embodiments, the slice estimation engine 114 itself may be executed as a background process. The slice estimation engine 114 may periodically or continuously monitor the application activity data 230 to determine when an application 112 switches to an operating mode warranting a change in its network slice allocation. For example, the slice estimation engine 114 may monitor application activity data 230 indicative of changes in an application's network utilization and initiate the slice assessment algorithm(s) 224 to select a new slice allocation based on the changes crossing a threshold.

Figure 3A:
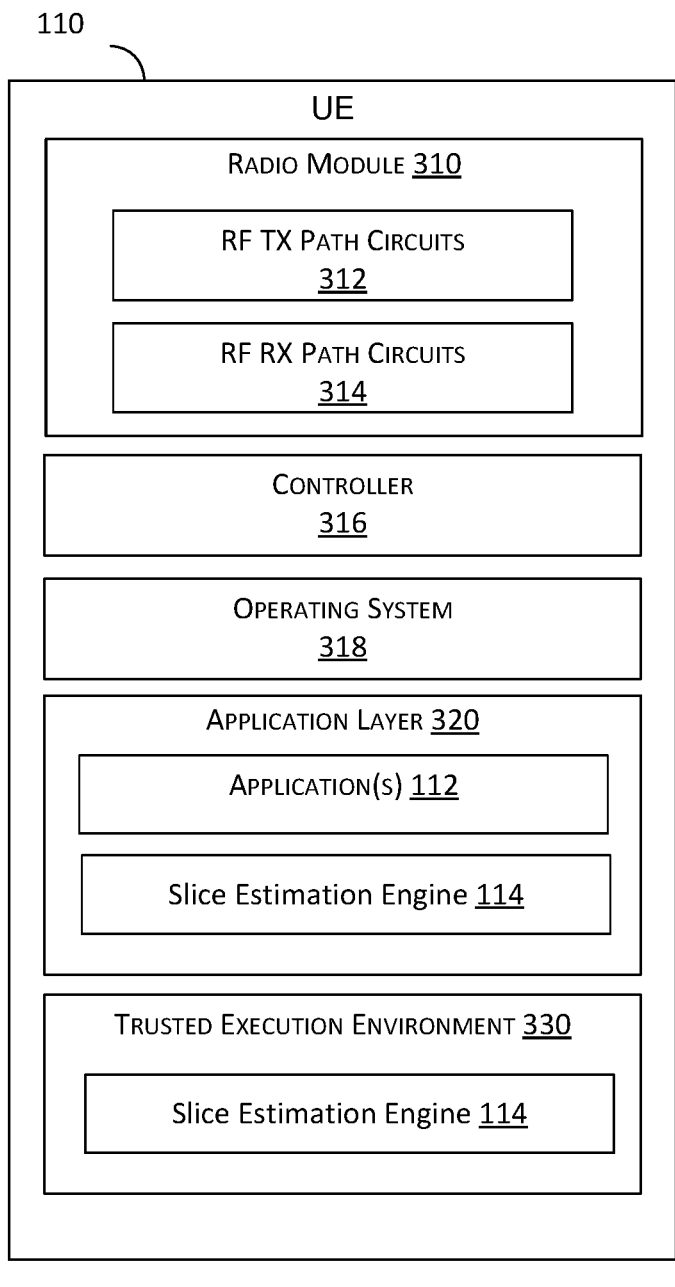
FIG. 3A is a diagram illustrating an example of user equipment hosting one or more elements of a slice estimation engine, in accordance with some embodiments described herein.

With reference now to FIG. 3A, FIG. 3A illustrates an example UE 110 that executes one or more elements of a slice estimation engine 114 as discussed herein. Although some UEs 110 may include different or other components, generally UE 110 includes at least one radio module 310 that includes one or more RF transmit (TX) path 312 circuits, one or more RF receive (RX) path 314 circuits, and a controller 316 (which may include one or more processors). Configuration of the RF TX path 312 and/or RF RX path 314 may be controlled by the radio module 310, for example, based on commands from an operating system 318 or other applications executed on the controller 316. In some embodiments, one or both of the TX path 312 and/or RF RX path 314 may comprise a plurality of RF paths, each corresponding to different frequency bands. In some embodiments, the UE 110 may authenticate with the operator core network 106 and access the telecommunications network 100 wirelessly through RAN 102 using the radio module 310. In some embodiments, the UE 110 in FIG. 3A may authenticate with the operator core network 106 and access the telecommunications network using 3GPP authentication and security protocols.

In the embodiment shown in FIG. 3A, the UE 110 includes operating system 318 and one or more executable applications (such as application(s) 112) that are executed by the controller 316. In some embodiments, the slice estimation engine 114 may be implemented at least in part as an application 112 executed by the controller 316. Generally a UE 110 may include at least application layer 320 and may also include a trusted execution environment (TEE) 330. The application layer 320 facilitates execution of the UE 110 operating system 318 and executables (including application(s) 112). In some embodiments, the application layer 320 provides a direct user interaction environment for the UE 110. TEE 330 facilitates a secure area of the processor(s) of UE 110. That is, TEE 330 provides an environment in the UE 110 where isolated execution and confidentiality features are enforced. Example TEEs that may be used for UE 110 include, but are not limited to, Arm TrustZone technology, Software Guard Extensions (SGX) technology, Reduced Instruction Set Computer-Five (RISC-V), or similar technologies. In some embodiments, one or more functions of the slice estimation engine 114 may be integrated into one or more trustlets executed within the TEE 330.

In some embodiments, application layer 320 may include applications executed in a rich environment and/or applications executed in the TEE 330. For example, the application layer 320 may comprise elements of the slice estimation engine 114 where one or more operations of the slice estimation engine 114—such as those used to query the operating system 318 for application activity data 230—are executed at as trustlet(s) in the TEE 330. Generally, a trustlet comprises computer-readable code protected from tampering or manipulation by a hardware Root of Trust that can securely access the data stored memory of the UE 110 or function of the operating system 318, which are otherwise inaccessible in the application layer 320. A trustlet may take the form of trusted processes, secure processes, isolated user mode (IUM) processes, or the like. For example, as a trustlet executed in TEE 330, the slice estimation engine 114 may access system-level data, private and/or public keys, and similar data stored, or accessed, by the UE 110. Trustlets can be activated in response to various network or UE 110 operations. For example, a trustlet can be activated by execution of an associated application 112 in the application layer 320. In some embodiments, the slice estimation engine 114 may be activated based on an interaction with one or more network functions of the operator core network 106. For another example, a trustlet can be activated in response to a command generated by a network function and communicated to the UE 110. For example, in some embodiments, a UE 110 may comprise as a trustlet a component responsive to the trigger 240 generated by a slice estimation engine 114 (e.g., either a UE 110 or UPF 136 hosted slice estimation engine 114) to generate a network slice allocation request to the operator core network 106.

Figure 3B:
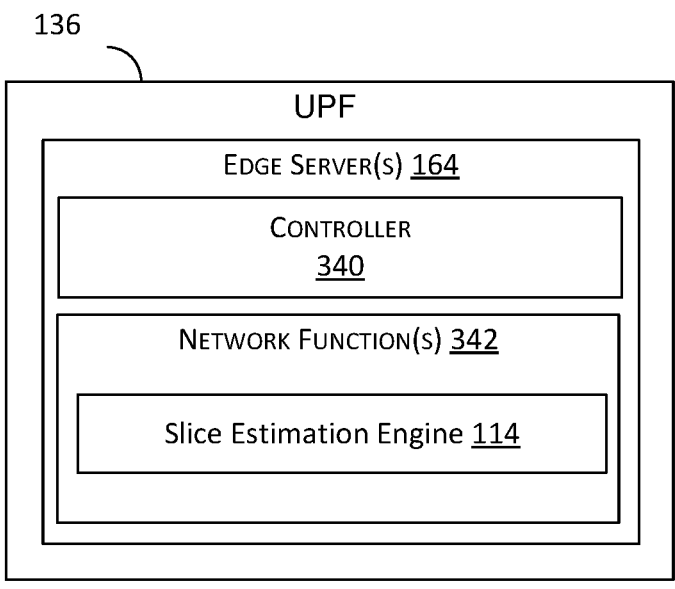
FIG. 3B is a diagram illustrating an example of a network function of a user plane function hosting one or more elements of a slice estimation engine, in accordance with some embodiments described herein.

Now referring to FIG. 3B, as previously mentioned, in some implementations one or more aspects of a slice estimation engine 114 may be implemented using one or more network functions 342, such as a network function hosted by the UPF 136. For example, one or more network functions 342 that include one or more elements of the slice estimation engine 114 may be executed by a controller 340 of one or more edge servers 164 that at least in part implement functions of the UPF 136. That is, the slice estimation engine 114 described herein may be executed as a network function 342 hosted by one or more network nodes of the UPF 136, such as edge server(s) 164. Alternatively, implementation of the slice estimation engine 114 described herein may be distributed between a UE 110 and the one or more network nodes of the UPF 136.

In operation, a UPF 136 hosted slice estimation engine 114 (such as illustrated in FIG. 3B) may operate in the same manner as described herein with respect to a UE 110 hosted slice estimation engine 114. That is, UPF 136 hosted slice estimation engine 114 may receive and evaluate application activity data 230 and trigger a UE 110 to request an update to the network slice allocation configuration used by an application 112. Having the slice estimation engine 114 running as a function of the UPF 136 has at least one advantage of avoiding, or at least limiting, installation of a slice estimation engine 114 on each UE 110, which would consume the relatively limited UE 110 processing resources while running continuously as a background process on the UE 110. As a trusted core network implemented function, the slice estimation engine 114 running as a function of the UPF 136 may further have the capacity to query the UE 110 regarding the use of UE resources by an application 112 to gather the application activity data 230. Based on this information, a UPF 136 hosted slice estimation engine 114 may evaluate resource allocations, buffer loadings, and/or other operating data within the UE 110, to characterize the type of network traffic associated with one or more of the applications 112 being executed by the UE 110. Like a UE 110 hosted slice estimation engine 114, a UPF 136 hosted slice estimation engine 114 may determine when an application should potentially be using a network slice having a higher or lower level of QoS based on the characteristics of network traffic for the current operating mode of an application 112. For some implementations, a UPF 136 hosted slice estimation engine 114 may have a limited, or no, capacity to query the UE 110 regarding the use of UE 110 resources by an application 112. To address such instances, in some embodiments, a UPF 136 hosted slice estimation engine 114 may collect at least part of the application activity data 230 by directly evaluating characteristics of network traffic between the UE 110 (and/or a specific application 112) and the UPF 136. Such characteristics of network traffic may include, but are not limited to, network traffic data rates, the amount of data being transferred through the UPF 136, routing selection policies, and/or other characteristics of traffic flow through the UPF 136 associated with that UE 110 such as network data latency, or patterns such as whether the network traffic is in the form of occasional traffic bursts as opposed to streaming, whether the traffic is primarily uplink versus downlink, or balanced in nature, and/or other characteristics. Based on the characteristics of network traffic, the UPF 136 hosted slice estimation engine 114 may determine what type of traffic is being used (video versus voice, AR, Haptic, etc.) and associate that with an operating mode of an application running on the UE. This information be used to send a trigger 240 from the UPF 136 hosted slice estimation engine 114 to the UE 110 to transmit a network slice allocation request to the core network 106 (e.g., a PDU session modification request), thereby dynamically modifying the network slice 115 allocated for use by an application 112. It should be understood that implementing a network function-based slice estimation engine 114 as a function of the UPF 136 is described for example purposes and that in other embodiments, one or more elements of a slice estimation engine 114 as described herein may be implemented as a component of other network functions 128 of the operator core network 106.

FIG. 4 is a flow chart illustrating a method 400 for dynamic network slice allocation, according to some embodiments. It should be understood that the features and elements described herein with respect to the method of FIG. 4 may be used in conjunction with, in combination with, or substituted for elements of any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa. In some embodiments, elements of method 400 are implemented utilizing one or more processing units, such as the controller of an operator core network, an edge server, a RAN, a UE, and/or other processing units, as disclosed in any of the embodiments herein. In some embodiments, the method 400 may be implemented by components of a telecommunications network environment 100, such as illustrated by FIG. 1. In some embodiments, the method may be performed at least in part by a slice estimation engine, such as the slice estimation engine 114 discussed above with respect to FIGS. 1 and 2.

The method 400 at B410 includes evaluating one or more characteristics of application activity data associated with at least one application executed on a user equipment (UE). The application activity data includes at least an indication of an operating mode of the at least one application. The UE is coupled to an operator core network of a telecommunications network via a wireless base station. For example, the UE may communicate using at least one communication link between a telecommunications operator core network and a wireless base station, such as RAN 102, for example. Evaluation of the one or more characteristics of application activity data is performed at least in part by a slice estimation engine executed as a network function (e.g., as a network function of the UPF) or as a process executed on the UE. The slice estimation engine comprises one or more slice assessment algorithms that predict the operating mode of the at least one application from the application activity data. In some embodiments, evaluation of the one or more characteristics of application activity data is performed at least in part by the at least one application. In some embodiments, the evaluation of the one or more characteristics of application activity data may include inferring the operating mode of the at least one application based on a machine learning model trained to implement a classification inference engine. As discussed above, application activity data may comprise an indication associated with the at least one application such as, but not limited to, a network traffic latency, a network traffic data rate, an amount of data traffic, a routing selection policy, a pattern of traffic flow, and an uplink versus downlink direction of traffic flow. In some embodiments, a slice estimation engine may apply the one or more slice assessment algorithms to evaluate in real-time the application(s) that are running on the UE and assess characteristics of application activity data associated with the application(s).

The method 400 at B412 includes associating the indication of the operating mode to a network slice allocation configuration. Associating the indication of the operating mode to a network slice allocation configuration may include, for example, correlating the indication of the operating mode to a network slice allocation policy to determine the network slice allocation configuration. As discussed herein, once an operating mode for an application is determined, a slice estimation engine may reference a network slice allocation policy and available slice data to determine which network slice the UE should request for the application given the current operating mode of the application. The slice estimation engine may use the network slice allocation policy to identify network slices that match the characteristics of network traffic for the application's current operating mode, and then select a network slice from the available slice data.

The method 400 at B414 includes triggering the UE to send a network slice allocation request to the operator core network to allocate a network slice to the UE based at least on the network slice allocation configuration. For example, the output from the slice estimation engine may comprise a trigger message that may be sent, for example, to a function of the operating system of the UE to cause the UE to request an allocation of a network slice from the operator core network. The network slice allocation request may include a slice identifier for the requested slice, and/or may comprises a PDU session modification request. In some embodiments, the method may determine the network slice for the network slice allocation request based at least on determining a set of network slices available for allocation to the UE by the telecommunications operator core network. The method may further include reconfiguring the UE based on an allocation of the requested network slice for the at least one application received in response to the network slice allocation request.

As an example, in some embodiments, the method may include triggering a first request to the telecommunications operator core network to allocate a first network slice allocation configuration for the at least one application based at least on a first indication that the at least one application is operating in a first operating mode associated with a first characteristic of network traffic, and triggering a second request to the telecommunications operator core network to allocate a second network slice allocation configuration for the at least one application based on a second indication that the at least one application has switched from operating in the first operating mode to operating in a second operating mode associated with a second characteristic of network traffic.

In some embodiments, the operator core network may first instantiate the requested network slice and transfer the application over to the new network slice instance before deallocating an initial network slice so that the application does not experience a substantive interruption of network connectivity and/or network traffic. That is, the application may remain running on the UE with an active PDU session during the network slice transfer from the first (e.g., initial) network slice to the second (e.g., requested) network slice. Increased network efficiency is thus realized by optimally matching the application's operating mode to a network slice while avoiding restarting and/or initializing the application with the operator core network to provide a new network slice to the application.

Figure 5:
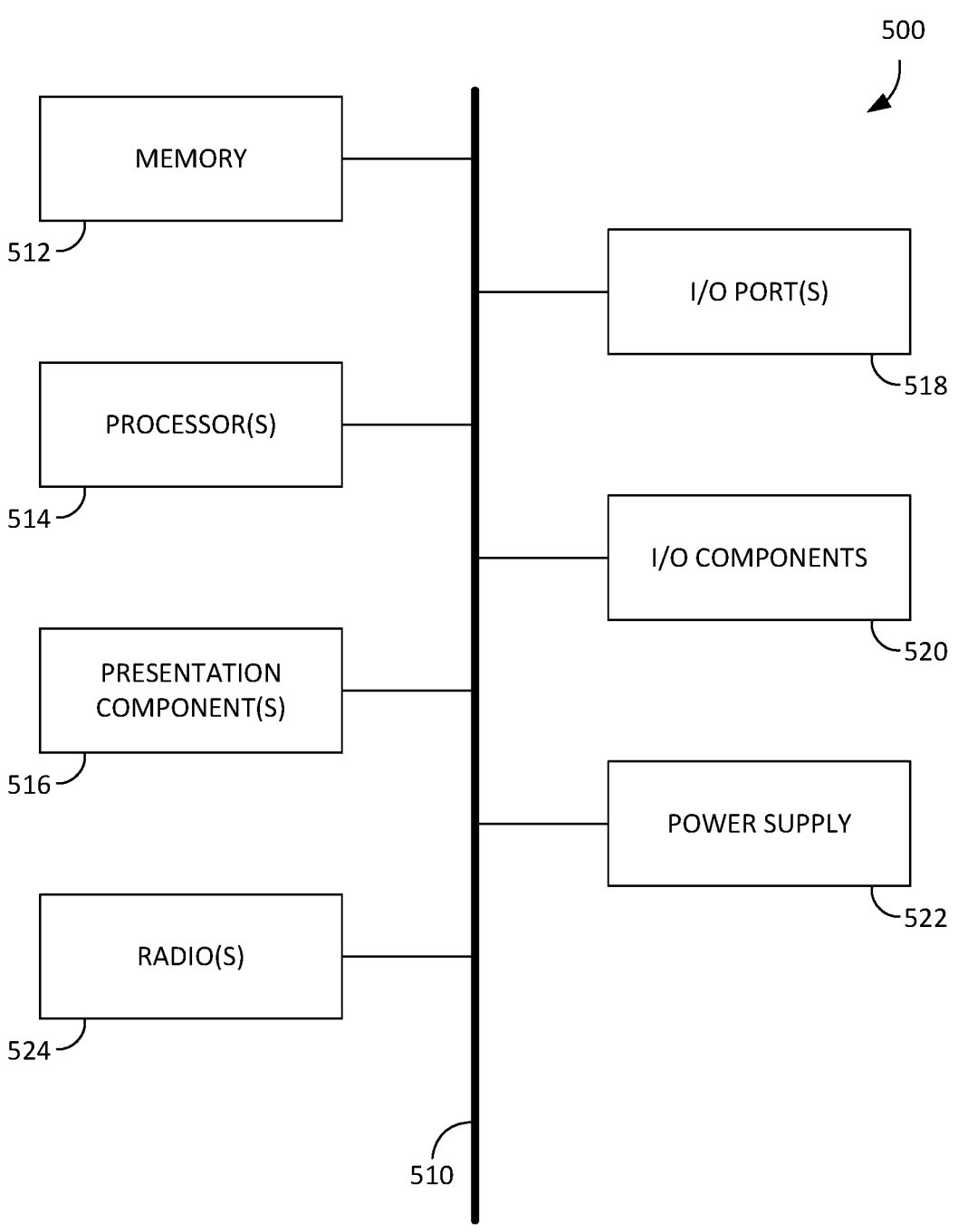
FIG. 5 is an example computing device, in accordance with some embodiments described herein.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the embodiments described herein, and nor should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 510 that directly or indirectly couples the following devices: memory 512, one or more processors 514, one or more presentation components 516, input/output (I/O) ports 518, I/O components 520, power supply 522, and radio 524. Bus 510 represents what may be one or more buses (such as an address bus, data bus, or combination thereof). The devices of FIG. 5 are shown with lines for the sake of clarity. However, it should be understood that the functions performed by one or more components of the computing device 500 may be combined or distributed amongst the various components. For example, a presentation component such as a display device may be one of I/O components 520. In some embodiments, one or more functions of a slice estimation engine 114 discussed herein may be executed at least in part by computing device 500. The processors 514 of computing device 500 may include a memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. For example, applications and/or trustlets for UE 110 and/or slice estimation engine 114 may be stored in a memory comprising such computer-readable media. Computer-readable media can be any available media that can be accessed by computing device 500 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or non-volatile memory. Memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. In some embodiments, the controller 316 is implemented by one or more of the processors 514. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built into computing device 500. Illustrative I/O components 520 include a microphone, joystick, game pad, satellite dish, scanner, printer, wireless device, etc.

Radio(s) 524 represents a radio that facilitates communication with a wireless telecommunications network. For example, radio(s) 524 may be used to establish communi-cations with components of the RAN 102, operator core network 106, and/or core network edge 105. The radio module 310 of FIG. 3A may be implemented at least in part by the radio(s) 525. Illustrative wireless telecommunications technologies include CDMA, GPRS, TDMA, GSM, and the like. Radio(s) 524 may additionally or alternatively facilitate other types of wireless communications including Wi-Fi, WiMAX, LTE, and/or other VOIP communications. In some embodiments, radio(s) 524 may support multimodal connections that include a combination of 3GPP radio technologies (e.g., 4G, 5G, and/or 6G) and/or non-3GPP radio technologies. As can be appreciated, in various embodiments, radio(s) 524 can be configured to support multiple technologies and/or multiple radios can be utilized to support multiple technologies. In some embodiments, the radio(s) 524 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 6:
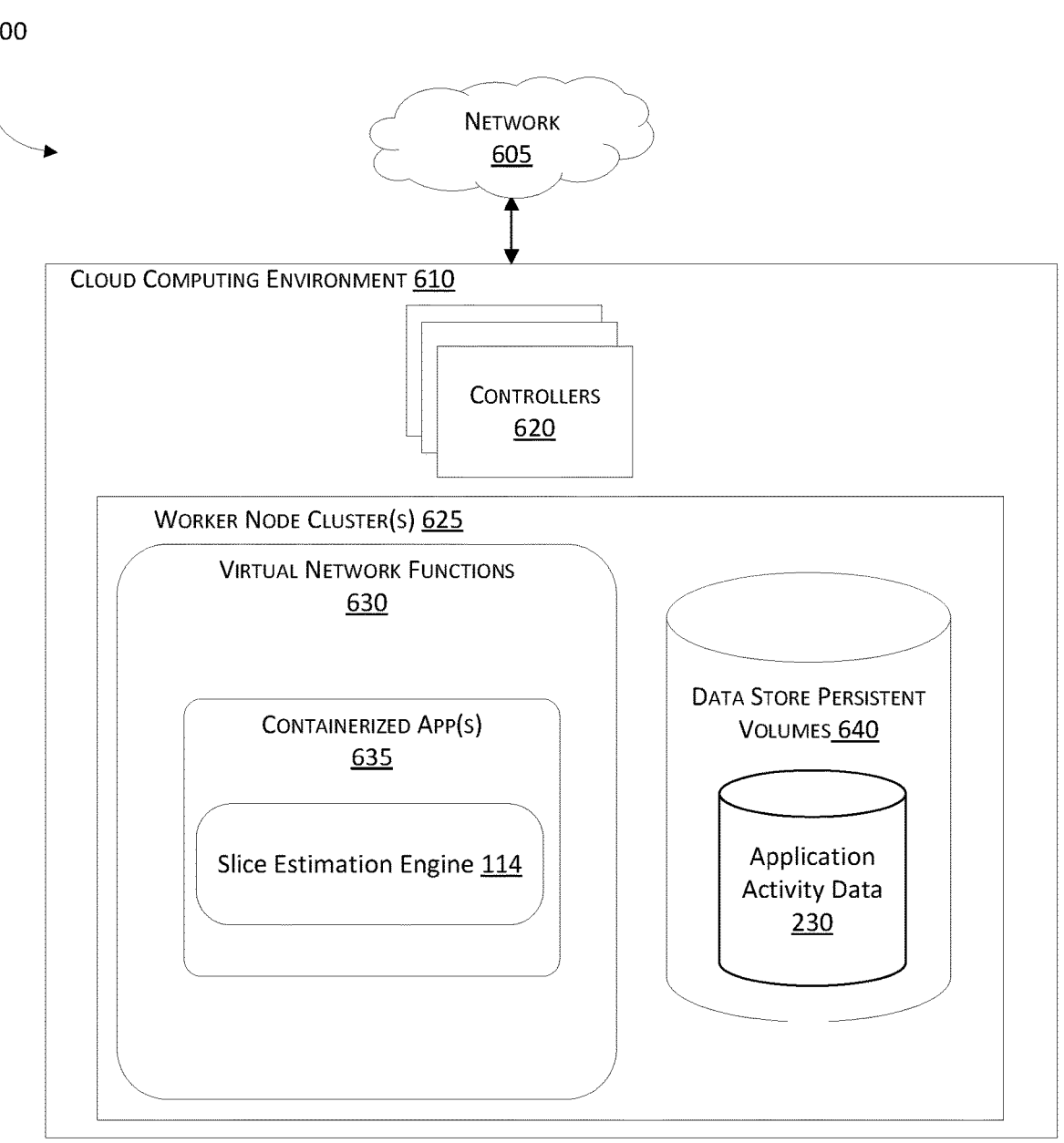
FIG. 6 is an example cloud computing platform, in accordance with some embodiments described herein.

Referring to FIG. 6, a diagram is depicted generally at 600 of an exemplary cloud computing environment 610 for implementing one or more aspects of an architecture for a slice estimation engine 114, as implemented by the systems and methods described herein. Cloud computing environment 610 is but one example of a suitable cloud computing environment and is not intended to suggest any limitation as to the scope of use or functionality of the embodiments presented herein, and nor should cloud computing environment 610 be interpreted as having any dependency or requirement relating to any one or combination of components illustrated. In some embodiments, the cloud computing environment 610 is coupled to a network 605 and executed within operator core network 106, the core network edge 105, edge server 164, or otherwise coupled to the core network edge 105 or operator core network 106.

Cloud computing environment 610 includes one or more controllers 620 comprising one or more processors and memory. The controllers 620 may comprise servers of a data center. In some embodiments, the controllers 620 are programmed to execute code to implement at least one or more aspects of the slice estimation engine 114. For example, in one embodiment a UPF 136 hosted slice estimation engine 114 as discussed herein may be implemented as one or more virtual network functions (VNFs) 630 (which may include one or more container network functions (CNFs)) running on a worker node cluster 625 established by the controllers 620.

The cluster of worker nodes 625 may include one or more orchestrated Kubernetes (K8s) pods that realize one or more containerized applications 635. In other embodiments, another orchestration system may be used. For example, the worker nodes 625 may use lightweight Kubernetes (K3s) pods, Docker Swarm instances, and/or other orchestration tools. In some embodiments, one or more elements of the network environment 100 may be implemented by, or coupled to, the controllers 620 of the cloud computing environment 610 by operator core network 106 and/or core network edge 105. In some embodiments, one or more elements of the slice estimation engine 114, such as the network slice allocation policy 220 and/or available slice data 222, may be implemented at least in part using one or more data store persistent volumes 640 in the cloud computing environment 610. In some embodiments, application activity data 230 from one or more UEs 110 may be aggregated and stored in the data store persistent volumes 640 for access by the slice estimation engine 114.

In various alternative embodiments, system and/or device elements, method steps, or example implementations described throughout this disclosure (such as the UE, access networks, core network edge, operator core network, network functions, slice estimation engine, slice coordination network function, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

As used herein, the terms "network function," "unit," "server," "node," and "module" are used to describe computer processing components and/or one or more computer-executable services being executed on one or more computer processing components. In the context of this disclosure, such terms used in this manner would be understood by one skilled in the art to refer to specific network elements and not used as nonce word or intended to invoke 35 U.S.C. 112 (f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for dynamic network slice allocation, the system comprising:
   one or more processors; and
   one or more computer-readable media storing computer-usable instructions that, when executed by the one or more processors, cause the one or more processors to:
      establish at least one communication link between a telecommunications operator core network and a user equipment (UE) via a wireless base station;
      evaluate one or more characteristics of application activity data associated with at least one application executed on the UE, wherein the application activity data includes at least an indication of an operating mode of the at least one application, wherein evaluation of the one or more characteristics of application activity data is performed at least in part by a slice estimation engine executed as a network function, wherein the slice estimation engine comprises one or more slice assessment algorithms that predict the operating mode of the at least one application from the application activity data;
      associate the indication of the operating mode to a network slice allocation configuration; and
      trigger a network slice allocation request to the telecommunications operator core network to allocate a network slice to the UE based at least on the network slice allocation configuration.

2. The system of claim 1, the one or more processors further to:
   correlate the indication of the operating mode to a network slice allocation policy to determine the network slice allocation configuration.

3. The system of claim 1, the one or more processors further to:
   determine the network slice for the network slice allocation request based at least on determining a set of network slices available for allocation to the UE by the telecommunications operator core network.

4. The system of claim 1, wherein evaluation of the one or more characteristics of application activity data is performed at least in part by the at least one application.

5. The system of claim 1, the one or more processors further to:
   trigger a first request to the telecommunications operator core network to allocate a first network slice allocation configuration for the at least one application based at least on a first indication that the at least one application is operating in a first operating mode associated with a first characteristic of network traffic; and
   trigger a second request to the telecommunications operator core network to allocate a second network slice allocation configuration for the at least one application based on a second indication that the at least one application has switched from operating in the first operating mode to operating in a second operating mode associated with a second characteristic of network traffic.

6. The system of claim 1, wherein evaluation of the one or more characteristics of application activity data is performed at least in part by the UE.

7. The system of claim 1, wherein the slice estimation engine is executed at least in part as a network function of the telecommunications operator core network.

8. The system of claim 1, the one or more processors further to:

evaluate the one or more characteristics of application activity data to infer the operating mode of the at least one application based on a machine learning model trained to implement a classification inference engine.

9. The system of claim 1, wherein the network slice allocation request comprises a Packet Data Unit (PDU) session modification request.

10. The system of claim 1, wherein the application activity data comprises an indication associated with the at least one application of one or more of:

a network traffic latency, a network traffic data rate, an amount of data traffic, a routing selection policy, a pattern of traffic flow, and an uplink versus downlink direction of traffic flow.

11. The system of claim 1, the one or more processors further to:

reconfigure a configuration of the UE based on an allocation of the network slice for the at least one application received in response to the network slice allocation request.

12. A telecommunications network, the network comprising:

at least one wireless base station coupled to an operator core network, wherein the at least one wireless base station establishes one or more communication links between the operator core network and a user equipment (UE);

one or more processors to perform one or more operations to:

evaluate application activity data associated with at least one application executed on the UE, wherein the application activity data includes at least an indication of an operating mode of the at least one application, wherein evaluation of the one or more characteristics of application activity data is performed at least in part by a slice estimation engine executed as a network function, wherein the slice estimation engine comprises one or more slice assessment algorithms that predict the operating mode of the at least one application from the application activity data;

associate the indication of the operating mode to a network slice allocation configuration; and trigger the UE to transmit a network slice allocation request to the operator core network to allocate a network slice to the UE for the at least one application, based at least on the network slice allocation configuration.

13. The network of claim 12, the one or more processors further to:

determine the network slice for the network slice allocation request based at least on determining a set of network slices available for allocation to the UE by the operator core network.

14. The network of claim 12, wherein the one or more processors performing the one or more operations are comprised at least in part in an edge server of a core network edge of the operator core network.

15. The network of claim 12, wherein the one or more operations are executed by an edge server as a network function of the operator core network.

16. The network of claim 12, wherein the application activity data comprises an indication associated with the at least one application of one or more of:

a network traffic latency, a network traffic data rate, an amount of data traffic, a routing selection policy, a pattern of traffic flow, and an uplink versus downlink direction of traffic flow.

17. A method for dynamic network slice allocation, the method comprising:

evaluating one or more characteristics of application activity data associated with at least one application executed on a user equipment (UE), wherein the application activity data includes at least an indication of an operating mode of the at least one application, wherein the UE is coupled to an operator core network of a telecommunications network via a wireless base station, wherein evaluation of the one or more characteristics of application activity data is performed at least in part by a slice estimation engine executed as a network function, wherein the slice estimation engine comprises one or more slice assessment algorithms that predict the operating mode of the at least one application from the application activity data;

associating the indication of the operating mode to a network slice allocation configuration; and triggering the UE to send a network slice allocation request to the operator core network to allocate a network slice to the UE based at least on the network slice allocation configuration.

18. The method of claim 17, the method further comprising:

triggering a first request to the operator core network to allocate a first network slice allocation configuration for the at least one application based at least on a first indication that the at least one application is operating in a first operating mode associated with a first characteristic of network traffic; and triggering a second request to the operator core network to allocate a second network slice allocation configuration for the at least one application based on a second indication that the at least one application has switched from operating in the first operating mode to operating in a second operating mode associated with a second characteristic of network traffic.

* * * * *